2 Sheets--Sheet 2.
CHARLES F. GERLACH.
Improvement in Pad Locks.
No. 124,677. Patented March 19, 1872.
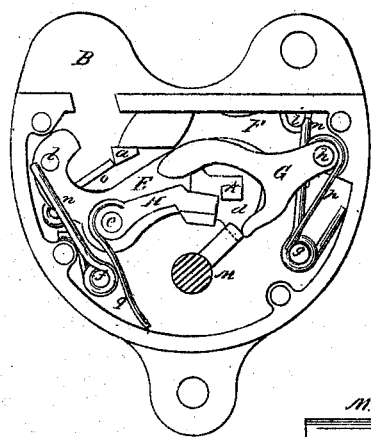
Fig. 7.
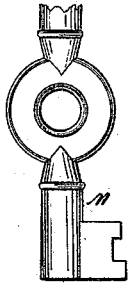
Fig. 8.
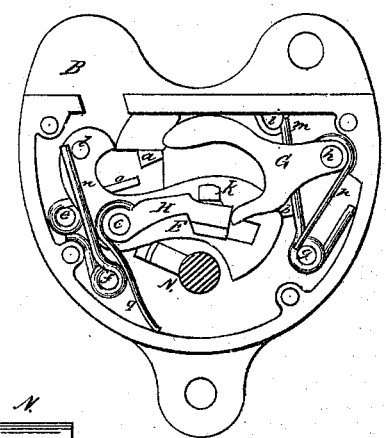
Fig. 9.
Fig. 10.
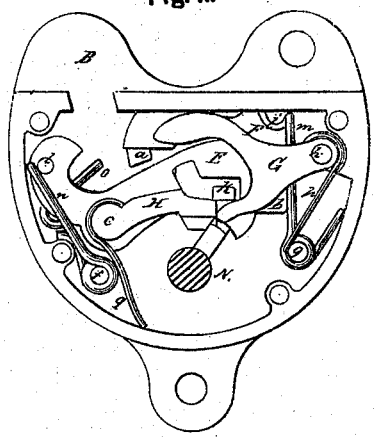
Fig. 11.
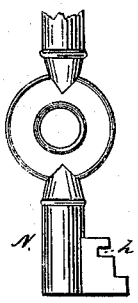
Fig. 12.
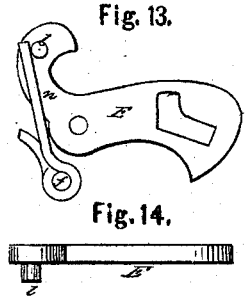
Fig. 13.
Fig. 14.
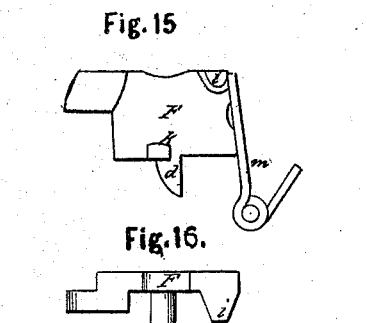
Fig. 15.
Fig. 16.
Fig. 17.
Fig 18.
Fig. 19.
Fig 20.
Witnesses: Inventor:

2 Sheets--Sheet 1.
CHARLES F. GERLACH.
Improvement in Pad Locks.
No. 124,677.
Patented March 19, 1872.
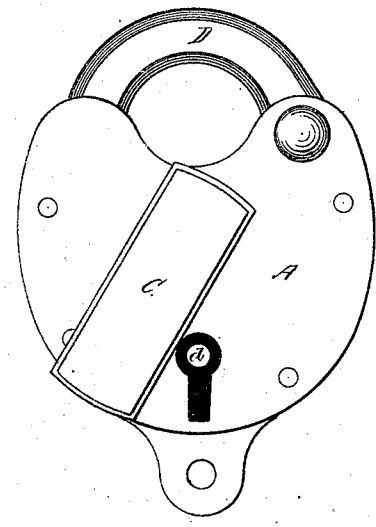
Fig. 1.
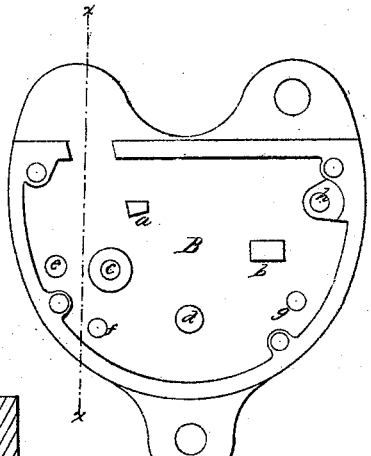
Fig. 2.
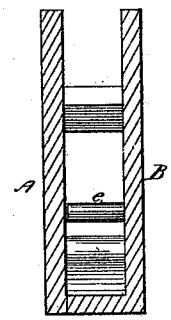
Fig. 3.
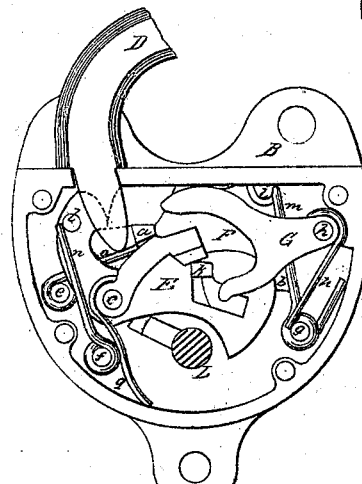
Fig. 4.
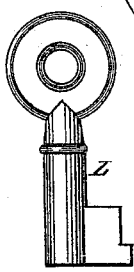
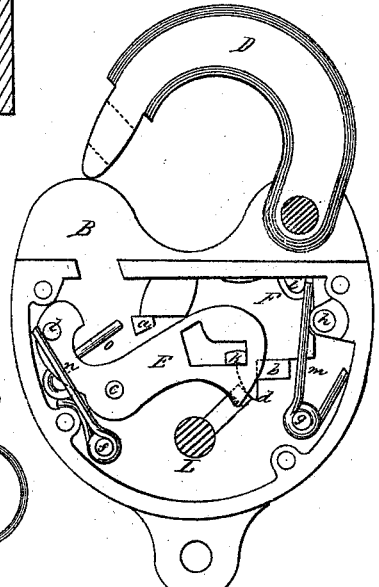
Fig. 5.
Witnesses:
J. P. C. Cottrill
John W. Cary
Inventor:
Charles F. Gerlach 124,677

UNITED STATES PATENT OFFICE.

CHARLES F. GERLACH, OF MILWAUKEE, WISCONSIN, ASSIGNOR TO HIMSELF AND JAMES M. WHALING.

IMPROVEMENT IN PADLOCKS.

Specification forming part of Letters Patent No. 124,677, dated March 19, 1872.

Be it known that I, CHARLES F. GERLACH, of the city of Milwaukee and State of Wisconsin, have invented new and useful Improvements in Padlocks; and I do hereby declare that the following is a description of the same and of the manner and process of making, constructing, and using it, which will enable others to make and use the same, reference being had to the accompanying drawing forming a part of this specification.

Nature and Objects of the Invention.

The object of my invention is to produce a padlock the mechanism of which is capable of being arranged in two distinct positions, so as to be operated by two different keys; and it consists in providing the lock with a lever and guard, by means of which, when the latter is in its normal position, the lock can be operated by either key; but when thrown down by the action of the lever and held in that position it can only be unlocked by one of the keys.

The invention is especially desirable and useful in all classes of business in which a considerable number of padlocks is required, all similar to each other and opened by the same keys in the hands of various operatives or employés in their ordinary use, but where it is at times desirable to change the lock so that but a few select employés intrusted with the other keys can gain access to whatever may be guarded by the locked padlock. It will be found to be equally useful as applied to the way and through mails of the United States; to the way and through matter of express and transportation companies and railway companies; and in many other species of business that will readily suggest themselves. The additional mechanism necessary is so simple and inexpensive that it can readily and at small cost be applied to nearly all the padlocks now in common use.

Description of the Accompanying Drawing.

Figure 1 is a front elevation of the lock with the key-hole exposed. Fig. 2 is a rear elevation, exhibiting the interior of the padlock-case with the internal mechanism removed. Fig. 3 is a transverse section on the line $x\,x$ of Fig. 2. Fig. 4 is an interior view, showing the working mechanism with the padlock locked and in condition to be opened or unlocked by the way or through key. Fig. 5 is an interior view, showing the padlock unlocked by the way-key, and showing only that part of the mechanism operated by the way-key, and with the way-key in the position to which it comes after the padlock is fully unlocked. Fig. 6 is the way-key. Fig. 7 is an interior view, exhibiting the working mechanism as operated by the change-key, shown in Fig. 8, and the process of changing the padlock from a way to a through lock, with the key at a point where it operates upon all the mechanism which it moves. Fig. 8 is the key that changes the padlock from a way to a through lock. Fig. 9 is an interior view, showing the working mechanism locked after it has been changed from a way to a through lock, and is in readiness to be unlocked by the through-key, shown in Fig. 12. Fig. 10 is the through-key, shown in Fig. 12, combined with the change-key, shown in Fig. 8, as intended for use. Fig. 11 is an interior view, exhibiting the working mechanism unlocked, as operated by the through-key, with the key at the point where it operates upon all the mechanism which it moves. Fig. 12 is the through-key. Fig. 13 is a face view of the locking-dog, and Fig. 14 is a top-edge view of the same. Fig. 15 is a face view of the sliding bolt, and Fig. 16 is a top-edge view of the same. Fig. 17 is a face view of the lever, and Fig. 18 is a top-edge view of the same. Fig. 19 is a face view of the guard, and Fig. 20 is a top edge view of the same.

General Description.

A represents the padlock, of the ordinary shape and size in use, with the ordinary key-hole guard C and shackle D. The shackle, when locked, is held in place by the locking-dog E and sliding bolt F engaging it from opposite sides; and this dog and bolt, by means of the springs $n$ and $m$, are thrown into a locked position, but will recede when the shackle is inserted, and are again thrown into the same position by the springs, making the padlock, as it were, self-locking. The spring $o$ serves to throw the shackle D upward and out of the padlock when the dog E and sliding bolt F are withdrawn from the shackle.

In unlocking the padlock with the way-key L, when the mechanism is in the position shown in Fig. 4, only the dog E and bolt F are moved by the key, the former moving in a circular direction with the upper point or hook moving from right to left and releasing the shackle from it, and the latter moving from left to right and releasing the shackle from it, in the manner in use in many ordinary padlocks, the shape of the dog and bolt being such as to permit the key to make a complete revolution.

In changing the padlock from a way to a through lock, insert the key M, Fig. 8, and, after it has moved the dog E and bolt F sufficiently to detach them from the shackle, the upper portion or point of the bit of the key engages the lever G at its lower or shortest arm, it then being in the position shown in Figs. 4, 9, and 11, and causing it to turn downward until its upper and longest arm engages the guard H and brings it downward to the position shown in Figs. 9 and 11. At the time the bolt F is being moved far enough to the right to permit the end of the guard H to pass below the pin K on said bolt, and when the key has passed the lower projection $d$ of the bolt F, and thus ceases to operate upon the bolt, the latter, with the pin K attached, is by means of the spring $m$ thrown back into the locked position before the guard H is released from the lever G, and thus the pin K is carried above the guard H and holds it firmly in the position shown in Fig. 9. The key, upon being further turned, passes the lower or shortest arm of the lever G, when the latter, by means of the spring $p$, is thrown upward into the position shown in Fig. 9, its lower arm serving to hold the guard H still more firmly in the position shown in Fig. 9. The padlock is then locked, so far as the position of the dog E and bolt F is concerned, and is ready to receive the shackle when inserted, and the lock is then changed from a way to a through lock, the guard H in the position described forming a ward, which the way-key L cannot pass, and thus, in order to unlock the padlock, the through-key N, shown in Fig. 12, must be used.

In unlocking the padlock with the through-key N the key engages and unlocks the dog E and bolt F precisely as they are unlocked with the way-key L and the change-key M. The through-key N, by means of the slot $h$ in its bit, passes the guard H, it being then in the position shown in Fig. 9, and thereby the key is enabled to fully withdraw the dog E and bolt F from the shackle, and thus fully unlock the padlock. As the key in moving the mechanism moves the bolt F far enough to the right to withdraw the pin K from above the guard H, so that the pin K no longer holds the guard H down, it is, by means of the spring $p$, again thrown upward and into the position shown in Fig. 4, and the lock is thus changed to a way-lock.

It will be observed that the through-key N will unlock the lock when the mechanism is in either position, while the way-key L can only unlock it when the mechanism is in the position shown in Fig. 4; in other words, key N is both a way and through key. And while the key M, shown in Fig. 8, also unlocks the padlock, if the mechanism is in the position shown in Fig. 4 it at the same time changes the mechanism into a through-lock, as shown in Fig. 9; and when then unlocked with the through-key N the mechanism is again changed to that of a way-lock.

The terms way and through are used for convenience of designating the two respective positions of the mechanism as changed by the keys, and also of designating the two forms of keys necessary to be used.

*Claims.*

I claim as my invention—

1. In a padlock, the lever G and guard H, when constructed and arranged to operate substantially as set forth.

2. In a padlock, the lever G, in combination with the guard H and pin K, constructed and arranged substantially as set forth.

3. The combination of the lever G, the guard H, and the pin K, with the dog E and bolt F, spring $m$, and the other locking mechanism, all arranged, constructed, moved, and operated in the manner described, and for the purposes set forth and specified.

CHARLES F. GERLACH.

Witnesses:
J. P. C. COTTRILL,
JOHN W. CARY.